Figure 2:
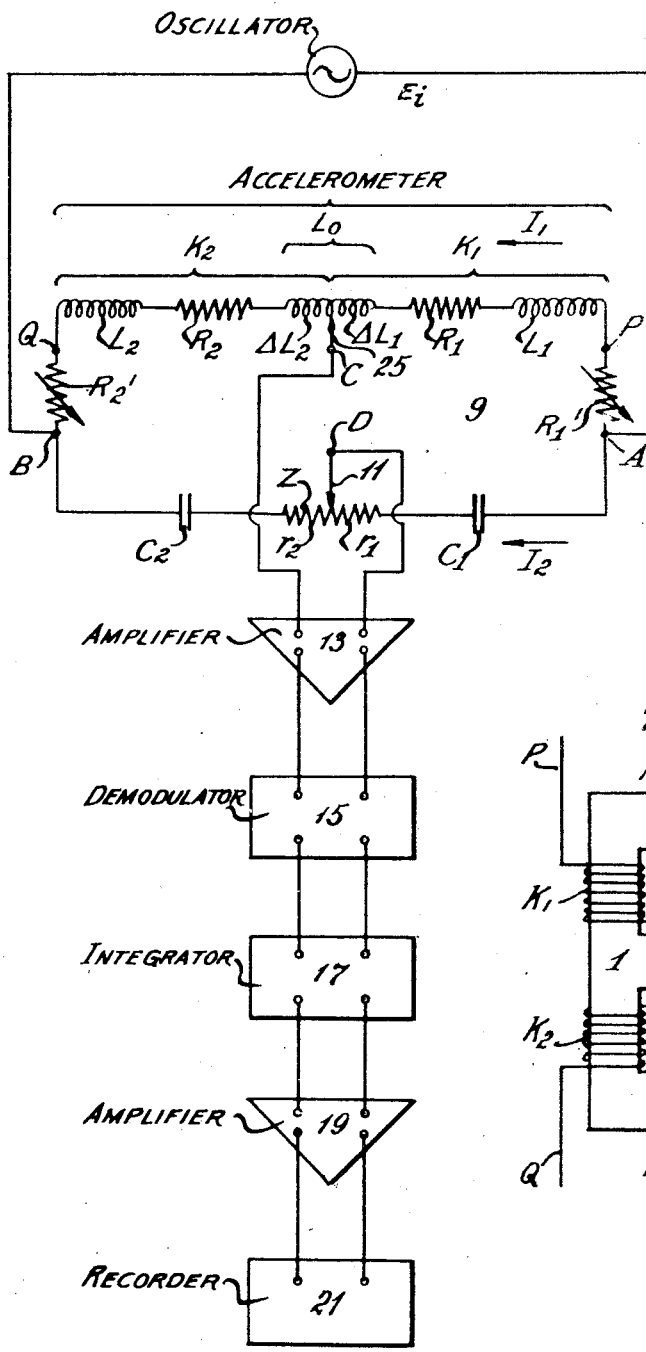

April 29, 1947. R. C. LAWLOR 2,419,573
ELECTRICAL MEASUREMENT OF CHANGES OF IMPEDANCE
Filed Feb. 26, 1943 2 Sheets-Sheet 1

INVENTOR
Reed C. Lawlor
BY
ATTORNEYS

Patented Apr. 29, 1947

2,419,573

UNITED STATES PATENT OFFICE 2,419,573

ELECTRICAL MEASUREMENT OF CHANGES OF IMPEDANCE

Reed C. Lawlor, Alhambra, Calif., assignor to Consolidated Engineering Corporation, Pasadena, Calif., a corporation of California Application February 26, 1943, Serial No. 477,323

1 Claim. (Cl. 177—351)

This invention is concerned with electrical measuring devices and particularly with devices adapted to measure changes in impedance.

Electrical devices for measuring impedance changes in coils and the like are employed for various purposes. Thus in measuring strains or vibrations it is customary to employ a pickup of the variable impedance type. The pickup includes a coil, the impedance of which varies in response to movements of an armature which in turn may move in response to vibrations or other displacement to be measured. A change of impedance in the coil is therefore an index of the vibration or other displacement being measured.

The variable impedance type of pickup may include two detecting coils, the impedances of which vary in opposite amounts in accordance with the displacement, acceleration or other quantity that is being measured. By disposing these coils in different arms of the same branch of a bridge upon which a carrier wave is impressed, the carrier wave at the output of the bridge may be varied in accordance with impedance changes and therefore in accordance with the physical quantity to which the pickup is responsive.

The apparatus is operated at a carrier frequency, i. e., at a frequency high compared to any frequency component of the quantity being measured.

In properly designed pickups of the type described above, for example, a pickup such as that shown in the copending application, Serial No. 477,320 filed February 26, 1943, by Washburn and Hoskins, the change of impedance of each coil is proportional to the displacement of an armature in the air gap of a core that passes through the coil. In such circumstances the percentage carrier modulation at the output of the bridge is proportional to the change in impedance of either coil and hence proportional to the armature displacement. Accordingly, in order to provide a system of this type in which the electrical output of the bridge is proportional to the quantity being measured, the electrical output always must be in phase with the difference in voltage across the two arms of the bridge which include the pickup coils in which the impedances vary.

With pickups such as those described above, the setting required to balance the bridge or to unbalance it may change with each orientation of the pickup; this effect arising because the neutral position of the pickup changes with the angle inclination with respect to the horizontal at which the pickup is disposed. In devices of the prior art, this balancing has required the simultaneous adjustment of two controls, which may be awkward and time-consuming. In accordance with the instant invention, a single control may be used for altering the degree of bridge unbalance without destroying the linear response characteristic of the circuit, i. e., the linear response to a quantity, say the amplitude of a vibration being measured.

Broadly, my invention contemplates an electrical apparatus adapted to measure changes in impedance and including a bridge, two coils disposed respectively in the two arms of one branch of the bridge, means for changing the impedance of at least one of the coils, means for impressing a carrier wave across the input of the bridge, whereby the carrier wave may be modulated by a change in impedance in said coils and means connected to the output of the bridge for measuring the carrier wave, the combination which comprises a balancing potentiometer having parts disposed in both arms of the second branch of the bridge, and two impedances disposed respectively at least in part in the two arms of the second branch, said impedances being of such characteristics as to produce a voltage in the balancing potentiometer that is in phase with the change in voltage across either coil.

In the preferred form of my apparatus, the impedances comprise resistances disposed respectively in the two arms of the first branch and reactances disposed respectively in the two arms of the second branch, said impedances being adjustable to the values which produce a voltage in the balancing potentiometer that is in phase with the change in voltage across either coil.

In the apparatus just described, the values of the adjustable impedances in the bridge that are disposed at least in part in the second branch of the bridge are such that the voltage across a balancing type impedance or resistance in this branch is in phase with any difference in voltage produced between the pickup (impedance) coils in the other branch of the bridge when the pickup armatures are displaced from their neutral positions. With such an arrangement the moving of a sliding contact of the potentiometer will vary the amplitude of the bridge output signal but without changing its phase. Consequently the bridge may be balanced or unbalanced to any desired degree by changing the position of the sliding contact of the potentiometer without destroying the linear relationship of bridge output with armature displacement.

Figure 1:
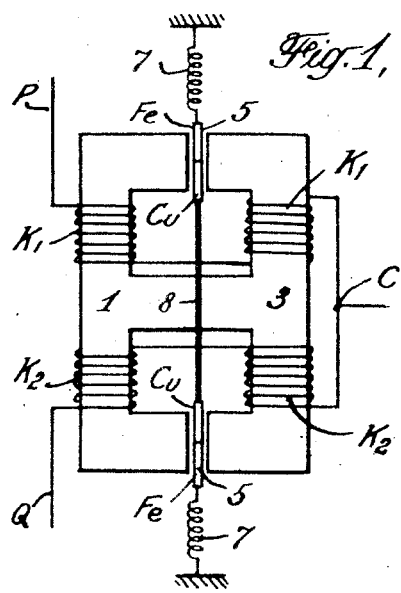
Figure 3:
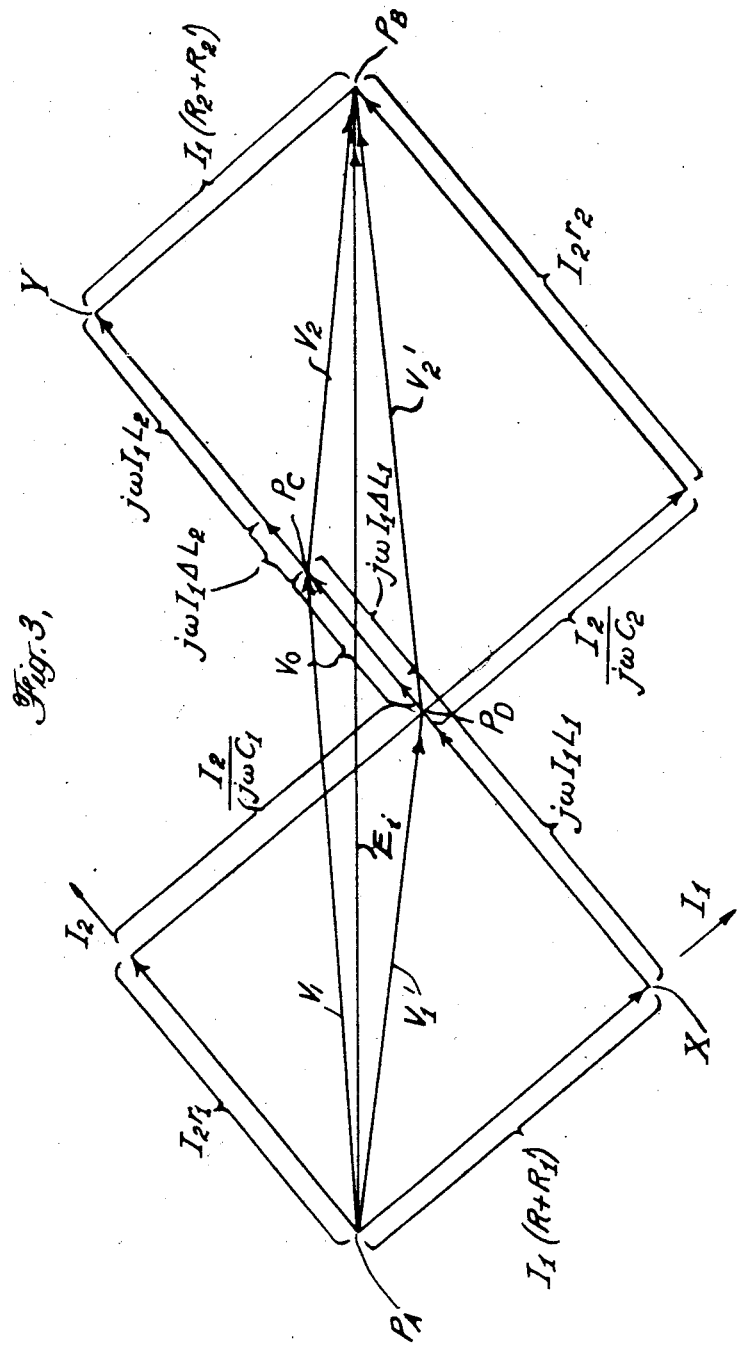

These and other features of my invention will be more thoroughly understood in the light of the following detailed description taken in conjunction with the accompanying figures in which Fig. 1 is a schematic diagram of a pickup for which the circuit of my invention is particularly applicable, Fig. 2 is a schematic wiring diagram of a preferred type of circuit of my invention, and Fig. 3 is a vector diagram which illustrates the operation of the circuit in Fig. 2.

As indicated above, Fig. 1 is a diagram of a pickup of the type disclosed in more detail in copending application Serial No. 477,320, filed February 26, 1943, by Harold W. Washburn and Edmund E. Hoskins. This accelerometer comprises a core of laminated iron made of two E sections 1 and 3 having the center legs of the E's in contact and the outside legs opposing each other and forming two air gaps in each of which there is an armature plate 5 resiliently suspended by a spring 7. The two armatures are rigidly connected together by a rigid member 8 so that they move together when the accelerometer (pickup) is subjected to vibrations. The center leg of the core and the end legs forming each air gap are in the form of a C shaped core. Around the ends of one C is wound a first coil $K_1$—$K_1$ and around the ends of the other a second coil $K_2$—$K_2$.

Each armature is in the form of a flat plate one part of which is a copper vane, and the other part of which is an iron vane. The two armatures are so constructed and arranged that as the amount of copper in one armature within one air gap increases the amount of copper in the other armature and in the other air gap decreases. Simultaneously the amounts of iron in the two gaps change oppositely to the amounts of copper in each gap. As the armatures move in the respective air gaps, the impedances of the two coils change by equal and opposite amounts so that the total impedance of the two coils connected in series is constant. In the figure, point C represents the junction of the two coils and points P and Q represent the ends of the respective coils remote from the junction.

As shown in Fig. 2, the two coils $K_1$ and $K_2$ may be connected as arms in a first branch of a Wheatstone bridge 9. Resistances $R_1'$ and $R_2'$ are connected between points A and B and points P and Q respectively of the bridge and are utilized for equalization purposes as explained hereinafter.

In the second branch of the bridge, there are two reactances here represented by condensers (capacitances) $C_1$ and $C_2$ in the arms adjacent the arms which include the coils $K_1$ and $K_2$ respectively, these reactances being in series with a potentiometer type impedance Z, here represented by a resistance, the portions of which, $r_1$ and $r_2$, in the two arms of the bridge including $C_1$ and $C_2$ respectively are determined by the position of a sliding contact 11 on the potentiometer type impedance or resistance.

The impedance Z and the capacitances $C_1$, $C_2$ may be of the variable type to aid in balancing the bridge initially.

The output of the bridge is taken between the terminal C which is the junction between coils $K_1$ and $K_2$ and terminal D connected to the sliding contact 11.

The bridge output is applied to a reproducing circuit comprising an amplifier 13, a demodulator 15, an integrator 17, an amplifier 19, and a recorder 21 connected in the order named.

The impedance of coil $K_1$ may be represented by a constant inductance $L_1$, a constant resistance $R_1$, and a variable portion $\Delta L_1$ connected in series. Similarly the impedance of coil $K_2$ may be represented by a constant inductance $L_2$, constant resistance $R_2$, and a variable portion $\Delta L_2$ connected in series. In general the variable portions of these impedances comprise both reactive and resistive portions, but to simplify the explanation, it is here assumed that the areas of copper and iron forming the armature in each air gap are such that as the armature moves in the air gap there is no variation in resistance of the corresponding coil. Since the total impedance of the two coils is constant, the variable portions $\Delta L_1$ and $\Delta L_2$ may here be represented by a single coil, a single constant inductance $L_0$, the value of which is equal to the sum of the absolute values of $\Delta L_1$ and $\Delta L_2$. The inductance $L_0$ may be considered as divided into parts $\Delta L_1$ and $\Delta L_2$ by a fictitious sliding contact 25, the position of which on the inductance $L_0$ depends upon the displacement of the armatures from their normal or neutral positions in the air gaps.

Currents $I_1$ and $I_2$ flow in the first and second branches of the Wheatstone bridge respectively. For satisfactory operation of the bridge with the particular elements shown, $I_1$ lags the applied voltage $E_i$ and $I_2$ leads the applied voltage $E_i$, the difference in phase between $I_1$ and $I_2$ being 90° as shown in Fig. 3.

The voltage $E_i$ applied to the bridge is represented by the vector extending $P_A$ to $P_B$.

The vector voltages across the various impedances in the first branch are added in the vector diagram in the order designated by the following equation:

$$E_i = I_1(R_1+R_1') + j\omega I_1 L_1 + j\omega I_1 \Delta L_1 + j\omega I_1 \Delta L_2 + j\omega I_1 L_2 + I_1(R_2+R_2') \quad (1)$$

The voltages across the impedances in the second branch of the bridge are added in the vector diagram in the order designated by the following equation:

$$E_i = I_2 r_1 + \frac{I_2}{j\omega C_1} + \frac{I_2}{j\omega C_2} + I_2 r_2 \quad (2)$$

The voltage of output terminals C and D are the voltages at points $P_C$ and $P_D$ respectively. The voltage $V_1$ across coil $K_1$ and resistance $R_1'$ is $$V_1 = I_1(R_1+R_1') + j\omega I_1 L_1 + j\omega I_1 \Delta L_1 \quad (3)$$

and which extends from point $P_A$ to point $P_C$, and the voltage $V_2$ across coil $K_2$ and resistance $R_2'$ is $$V_2 = j\omega I_1 \Delta L_2 + j\omega I_1 L_2 + I_1(R_2+R_2') \quad (4)$$

which extends from point $P_A$ to point $P_C$. The voltages across the upper and lower arms of the second branch of the bridge are respectively $$V_1' = I_2 r_1 + \frac{I_2}{j\omega C_1} \quad (5)$$

and $$V_2' = L_2 j\omega C_2 + I_2 r_2 \quad (6)$$

The output voltage across terminals C and D is $$V_0 = V_1 - V_1' \quad (7)$$

$$= [I_1(R_1+R_1') + j\omega I_1 L_1 + j\omega I_1 \Delta L_1] - \left[I_2 r_1 + \frac{I_2}{j\omega C_1}\right] \quad (8)$$

From the foregoing equations or vector diagram, it can be shown that the output voltage $V_0$ will always be in the same phase provided $R_1'$ and $R_2'$ are set at such values that $$(R_1+R_1')C_1 = (R_2+R_2')C_2 \quad (9)$$

and in this case the amount of bridge unbalance may be varied by adjustment of the single slide contact 11. Displacement of the armatures from their neutral position will cause point $P_C$ to change position along the same line XY which intersects the line $P_A P_B$ and on which lie the vectors $j\omega I_1 L_1$, $j\omega I_1 \Delta L_1$, $j\omega I_1 \Delta L_2$, and $j\omega I_1 L_2$. The adjustment of contact 11 causes point $P_D$ to move along the line XY. Under these circumstances, if the bridge is unbalanced, while the accelerometer is stationary and in position for measuring vibration, then the percentage modulation of the carrier wave appearing in the output of the bridge will always be proportional to the instantaneous value of the acceleration amplitude provided, of course that overmodulation does not occur. Thus my invention provides a system having a linear response so long as over-modulation does not occur.

Generally speaking, it can be shown that single knob control of the degree of bridge unbalance can be achieved without upsetting the proportionality of percentage carrier modulation to armature displacement providing the following conditions exist.

1. The voltage across the potentiometer type impedance Z is in phase with changes produced in voltage difference between the coils $K_1$ and $K_2$ in response to armature displacement.

2. The components of voltage in the four arms of the bridge which are perpendicular (90° out of phase with) the voltage across the potentiometer type impedance Z bear a proportional relationship, that is $$\frac{\overline{V_1}}{\overline{V_2}} = \frac{\overline{V_1'}}{\overline{V_2'}}$$

where the bar over the V's indicates that the voltage in question is the component of the voltage V 90° out of phase with the voltage $I_2 Z$ across the potentiometer type impedance.

In other words, the values of the electrical elements in the various bridge arms are such that the components of voltage which are in the arms of one branch and which are 90° out of phase with the bridge output are equal to such components in adjacent arms of the other branch.

3. The impedance change in either coil is proportional to the armature movement.

It should be observed that the two variable impedances disposed respectively at least in part in the two arms of the second branch of the bridge comprise the resistance $R_1'$ and the capacitance $C_1$ in one case and the resistance $R_2'$ and the capacitance $C_2$ in the other case.

It is clear of course, that this system may be applied to the measurement of other quantities than acceleration or displacement or to other types variable impedance of pickups than the one described here. It has application to bridge circuits utilizing such pickups when the bridge output voltage is out of phase with the bridge input voltage and is applicable to other types of circuits than Wheatstone bridges. While the invention has been described as applied to a pickup having two coils, the total impedance of which is constant, it is to be understood that it is equally applicable if the pickup in question has only a single coil of variable impedance and a coil of constant impedance is utilized in the other arm of the bridge in series with it.

I claim:

In electrical apparatus adapted to measure changes in impedance and including a bridge, two coils disposed respectively in the two arms of one branch of the bridge, means for changing the impedance of at least one of the coils, means for impressing a carrier wave across the input of the bridge, whereby the carrier wave is modulated by a change of impedance in said coils, and means connected to the output of the bridge for measuring the carrier wave, the combination which comprises a balancing potentiometer having a resistance disposed in both arms of the second branch of the bridge, and impedances comprising resistances disposed respectively in the two arms of the first branch and capacitances disposed respectively in the arms of the second branch, said impedances being adjustable to such values as to produce a voltage in the balancing potentiometer that is in phase with a change in voltage across either coil.

REED C. LAWLOR.

REFERENCES CITED

The following references are of record in the file of this patent:

UNITED STATES PATENTS

| Number | Name | Date |
|---|---|---|
| 2,210,970 | Bonell | Aug. 13, 1940 |
| 2,305,267 | Minor | Dec. 15, 1942 |
| 2,240,184 | Hathaway | Apr. 29, 1941 |